US012449869B2

(12) United States Patent
Lin (10) Patent No.: US 12,449,869 B2
(45) Date of Patent: Oct. 21, 2025

(54) CHARGING DEVICE (71) Applicant: SHENZHEN BENKS TECHNOLOGY CO., LTD, Shenzhen (CN)

(72) Inventor: Xiaojiong Lin, Shenzhen (CN)

(73) Assignee: SHENZHEN BENKS TECHNOLOGY CO., LTD, Shenzhen (CN)

( * ) Notice: Subject to any disclaimer, the term of this patent is extended or adjusted under 35 U.S.C. 154(b) by 351 days.

(21) Appl. No.: 18/317,111

(22) Filed: May 15, 2023

(65) Prior Publication Data

US 2023/0376098 A1 Nov. 23, 2023

(30) Foreign Application Priority Data

May 23, 2022 (CN) .......................... 202221246891.5
May 23, 2022 (CN) .......................... 202221261187.7
Jun. 21, 2022 (CN) .......................... 202221579007.X (51) Int. Cl.
*G06F 1/26* (2006.01)
*H02J 50/10* (2016.01)
*H05K 5/02* (2006.01)
*H05K 7/20* (2006.01)

(52) U.S. Cl.
CPC ............. *G06F 1/26* (2013.01); *H05K 5/0213* (2013.01); *H05K 7/2039* (2013.01); *H02J 50/10* (2016.02)

(58) Field of Classification Search
CPC .......... G06F 1/26; H02J 50/10; H05K 5/0213; H05K 7/2039
See application file for complete search history.

(56) References Cited

U.S. PATENT DOCUMENTS

| 11,394,247 | B1* | 7/2022 | Tsibulevskiy | ............. | H02J 7/06 |
| 2017/0063134 | A1* | 3/2017 | Sultenfuss | ............ | H02J 7/0042 |
| 2022/0256732 | A1* | 8/2022 | Wu | ....................... | H02J 7/0044 |

* cited by examiner

*Primary Examiner* — Terrell S Johnson
(74) *Attorney, Agent, or Firm* — Andrew C. Cheng (57) ABSTRACT

A charging device is provided, which includes a housing and a charging module accommodated in the housing. The charging module defines a heating surface, and a first ventilation structure communicated with the interior of the housing is disposed on a side of the housing close to the heating surface. A heat-dissipating gel structure is disposed between the heating surface and the side of the housing on which the first ventilation structure is disposed and communicated with ambiance through the first ventilation structure. The heat-dissipating gel structure is in contact with the heating surface and communicated with the outside air through the first ventilation structure to achieve functions of excellent adaptive heat-dissipating, excellent heat dissipation and safety protection.

19 Claims, 8 Drawing Sheets

CHARGING DEVICE

CROSS-REFERENCE TO RELATED APPLICATIONS

This application claims priority to Chinese Patent Application No. 202221261187.7, 202221246891.5 and 202221579007.X, disclosure of which is hereby incorporated by reference in its entireties.

TECHNICAL FIELD

The present disclosure relates to the technical field of electronic-device charging, and more particularly to a charging device.

BACKGROUND

With technology innovation and social progress, portable mobile electronic devices such as mobile phones, smart watches, and charging devices matched therewith have become more and more inseparable from our daily necessities. When charging electronic devices, due to the heating of the charging device and the electronic device, the electronic device may be heated seriously during charging, which can cause damage to both the charging device and the electronic device and even cause a fire. Most of the existent charging devices use a built-in fan to actively dissipate heat, however, the temperature reduction thereof is not good. Therefore, it is particularly important to seek a charging device with excellent heat dissipation.

SUMMARY

In order to overcome the defect of the existent charging devices, the present disclosure provides a charging device.

In order to solve the above technical problems, the present disclosure provides a charging device, which includes a housing and a charging module accommodated in the housing; the charging module defines a heating surface; a first ventilation structure communicated with the interior of the housing is disposed on one side of the housing close to the heating surface; a heat-dissipating gel structure is disposed between the heating surface and the side of the housing on which the first ventilation structure is disposed, and the heat-dissipating gel structure is communicated with the ambiance through the first ventilation structure.

Preferably, the first ventilation structure defines at least one ventilation channel hollowed out in the thickness direction of the housing.

Preferably, the first ventilation structure includes a support body on the housing extending from the side on which the ventilation channel is positioned to the direction away from the housing.

Preferably, the support body is made of metal material and configured in an array with gaps defined therebetween.

Preferably, the support body is disposed at an angle to the plane of the housing on which the first ventilation structure is disposed.

Preferably, the heat-dissipating gel structure is made of a flexible material, and includes a flexible heat-conducting layer in contact with the heating surface of the charging module, a flexible heat-dissipating layer including a heat-dissipating hydrogel, and a flexible protective layer, which are stacked in sequence from the direction close to the charging module to the direction away from the charging module.

Preferably, the flexible protective layer is close to the inner surface of the housing on which the first ventilation structure is disposed, and a second ventilation structure communicated with the first ventilation structure is formed on the flexible protective layer.

Preferably, the thickness of the heat-dissipating gel structure is in the range of 1.0-1.2 mm.

Preferably, the reducing temperature of the heat-dissipating gel structure and the first ventilation structure to the heating surface of the charging module is in the range of 1-6° C.

Preferably, the charging device further includes a support frame on the housing at the side thereof away from the heat-dissipating gel structure, and one end of the housing corresponding to the support frame is provided with a rotating structure damply connected with the rotating structure.

Preferably, the charging device is any one of a wireless charger for electronic devices, a power bank, and a charger for electronic devices.

Compared with the prior art, the charging device of the present disclosure has the following beneficial effects.

The charging device of the present disclosure includes a housing and a charging module accommodated in the housing. The charging module defines a heating surface, and a first ventilation structure communicated with the interior of the housing is disposed on a side of the housing close to the heating surface. A heat-dissipating gel structure is disposed between the heating surface and the side of the housing on which the first ventilation structure is disposed, and the heat-dissipating gel structure is communicated with the ambiance through the first ventilation structure. The heat-dissipating gel structure is in contact with the heating surface and communicated with the ambiance through the first ventilation structure, so that the charging device can have functions of excellent adaptive heat-dissipating, excellent heat dissipation and safety protection.

The first ventilation structure of the present disclosure defines at least one ventilation channel hollowed out in the thickness direction of the housing, which allows the outside air to enter the heat-dissipating gel structure in the housing through the ventilation channel, and ensures that the heat-dissipating gel structure can obtain moisture in the air for adaptive heat dissipation.

The first ventilation structure of the present disclosure includes a support body on the housing extending from the side on which the ventilation channel is positioned to the direction away from the housing. It can be understood that when charging an electronic device, the charging device is generally placed on a bearing surface such as a tabletop facing downward with respect to the electronic device, and the support body, due to the height thereof, can support the housing and the electronic device at a certain distance from the tabletop, which can prevent the ventilation channel from being covered by the tabletop to facilitate the smooth entry of outside air into the heat-dissipating gel structure through the ventilation channel.

The support body of the present disclosure is made of metal material, and is arranged in an array with gaps defined therebetween. It can be understood that part of the heat of the charging module in the housing will be conducted to the housing, and the support body formed on the housing and made of metal material that has good thermal conductivity can better conduct heat to the ambiance. In addition, the arrangement of the array with gaps is aesthetic and beneficial to the stability of the support and the air circulation speed. Thus, the heat-dissipating effect of the charging module is enhanced.

The support body of the present disclosure is arranged at an angle to the plane of the housing on which the first ventilation structure is disposed. It can be understood that the angle arrangement does not limit the support form of the support body, and there can be a variety of aesthetic designs, as long as the support body is at a certain height away from the bearing surface when supporting the housing in normal use to ensure the outside air can smoothly pass through the gaps between the support body and enter the heat-dissipating gel structure.

The heat-dissipating gel structure of the present disclosure is made of a flexible material, and includes a flexible heat-conducting layer in contact with the heating surface of the charging module, a flexible heat-dissipating layer including a heat-dissipating hydrogel, and a flexible protective layer, which are stacked in sequence from the direction close to the charging module to the direction away from the charging module. It can be understood that the heat of the charging module can be conducted to the flexible heat-dissipating layer and the flexible protective layer through the flexible heat-conducting layer for heat dissipation, or outside moisture can also be conducted from the ambiance to the charging module through the flexible heat-dissipating layer, which realizes multiple and maximum protections for heat conduction, heat dissipation and protection of the charging module. Further, the flexible heat-conducting layer is in contact with the heating surface of the charging module, which can first realize effective heat conduction and flexible collision protection for the charging module; second, the flexible heat-conducting layer can be used as a carrier to which the flexible heat-dissipating layer is adhered; third, the hydrogel heat-dissipating layer is a temperature-sensitive and flexible hydrogel film that sweats like organisms to dissipate heat at high temperature and absorbs and stores water at low temperature, and circulates in this way to dissipate most of the heat as simple and efficient as skin via the principle of phase transition to dissipate heat; fourth, the gas-permeable dustproof or gas-permeable waterproof flexible protective layer is close to the first ventilation structure to provide a transmission path of moisture for the flexible heat-dissipating layer and to prevent external dust from adhering to and damaging the flexible heat-dissipating layer.

The flexible protective layer of the present disclosure is close to the inner surface of the housing that forms the first ventilation structure, and a second ventilation structure communicated with the first ventilation structure is formed on the flexible protective layer. It can be understood that the second ventilation structure with a small aperture is provided to make the flexible protective layer gas-permeable, dustproof and waterproof, while the first ventilation structure, which pays more attention to the ventilation effect, is hollowed out with a ventilation channel. Thus, the air communication therebetween ensures that air and moisture can be convected through the first ventilation structure to the second ventilation structure, and then transmitted to the flexible heat-dissipating layer to realize the heat dissipation protection of the charging module.

The thickness of the heat-dissipating gel structure of the present disclosure is in the range of 1.0-1.2 mm. It can be understood that the thickness range of the heat-dissipating gel structure is reasonably controlled, so that the entire heat-dissipating gel structure is light and thin, which is more conducive to heat dissipation while giving users a comfortable experience.

In the present disclosure, the reducing temperature of the heat-dissipating gel structure and the first ventilation structure to the heating surface of the charging module is in the range of 1-6° C., which realizes effective heat dissipation and protection of the charging device.

The charging device further includes a support frame on the housing at the side thereof away from the heat-dissipating gel structure, and one end of the housing corresponding to the support frame is provided with a rotating structure damply connected with the rotating structure. It is understood that the rotating structure and the support frame damply connected with the rotating structure are provided on the housing, such that after the electronic device is attached to the charging device, the connection between the support frame and the housing is achieved via the connection between the support frame and the rotating structure. Thus, the support frame can be rotatably connected to the housing and the relative position therebetween after rotation can be maintained via the damping force. Additionally, after rotation, the charging device and the electronic device can be supported at different angles when in use to improve practicality thereof.

The charging device of the present disclosure is any one of a wireless charger for electronic devices, a power bank, and a charger for electronic devices, which can meet different needs of users.

BRIEF DESCRIPTION OF DRAWINGS

To illustrate the technical solutions in the embodiments of the present disclosure more clearly, the following briefly introduces the accompanying drawings used in the description of the embodiments or the prior art. Obviously, the drawings in the following description are only some embodiments of the present disclosure, and for those skilled in the art, other drawings can also be obtained according to the drawings without any creative effort.

NUMERICAL REFERENCE IDENTIFICATION 1, charging device;
10, housing; 20, charging module; 30, heat-dissipating gel structure; 40, device to be charged;
101, first ventilation structure; 201, heating surface; 301, flexible heat-conducting layer; 302, flexible heat-dissipating layer; 303, flexible protective layer;

1011, ventilation channel; 1012, support body; 3031, second ventilation structure.
2, charging device;
102, support frame; 103, rotating structure; 104, magnetic attraction member;
1021, shaft seat; 1023, accommodating slot; 1031, fixing seat; 1032, rotating shaft; 10311, shaft hole.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that when an element is referred to as being "fixed to" another element, it can be directly on the other element or intervening elements may also be present. When an element is referred to as being "connected" to another element, it can be directly connected to the other element or intervening elements may also be present. The terms "vertical," "horizontal," "left," "right," and similar expressions are used herein for illustrative purposes only.

It should be noted that, in the present disclosure, the terms "up", "down", "left", "right", "front", "rear", "top", "bottom", "inside", "outside", "middle", "vertical", "horizontal", "longitudinal", etc. are based on the orientations or positional relationships shown in the drawings. Terms herein are primarily used to better describe the disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term "on" may also be used to express a certain attachment or connection relationship in some cases. For those skilled in the art, the specific meanings of the above terms in the present disclosure can be understood according to specific situations.

Furthermore, the terms "install", "arrange", "provide", "connect", "contact" should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Figure 1:
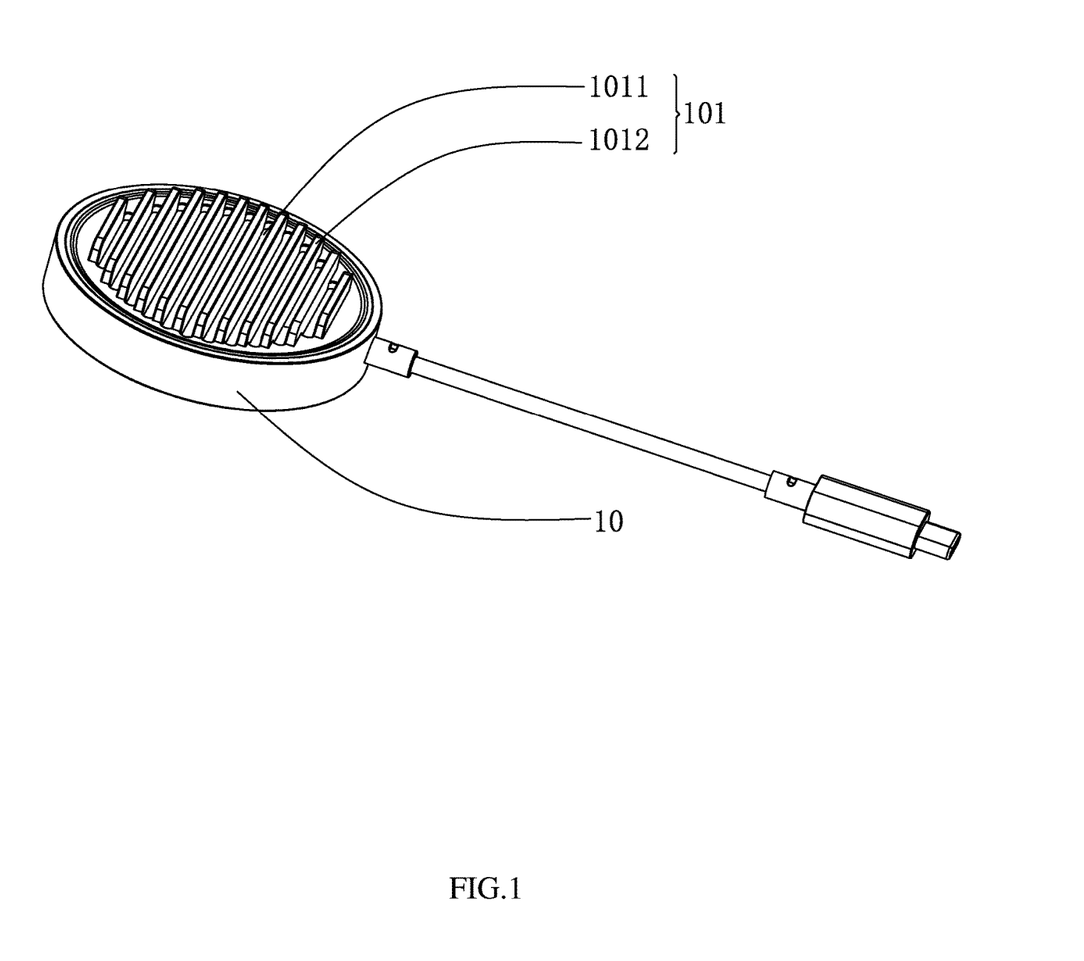
FIG. 1 is a perspective view of a charging device according to a first embodiment of the present disclosure.
Figure 2:
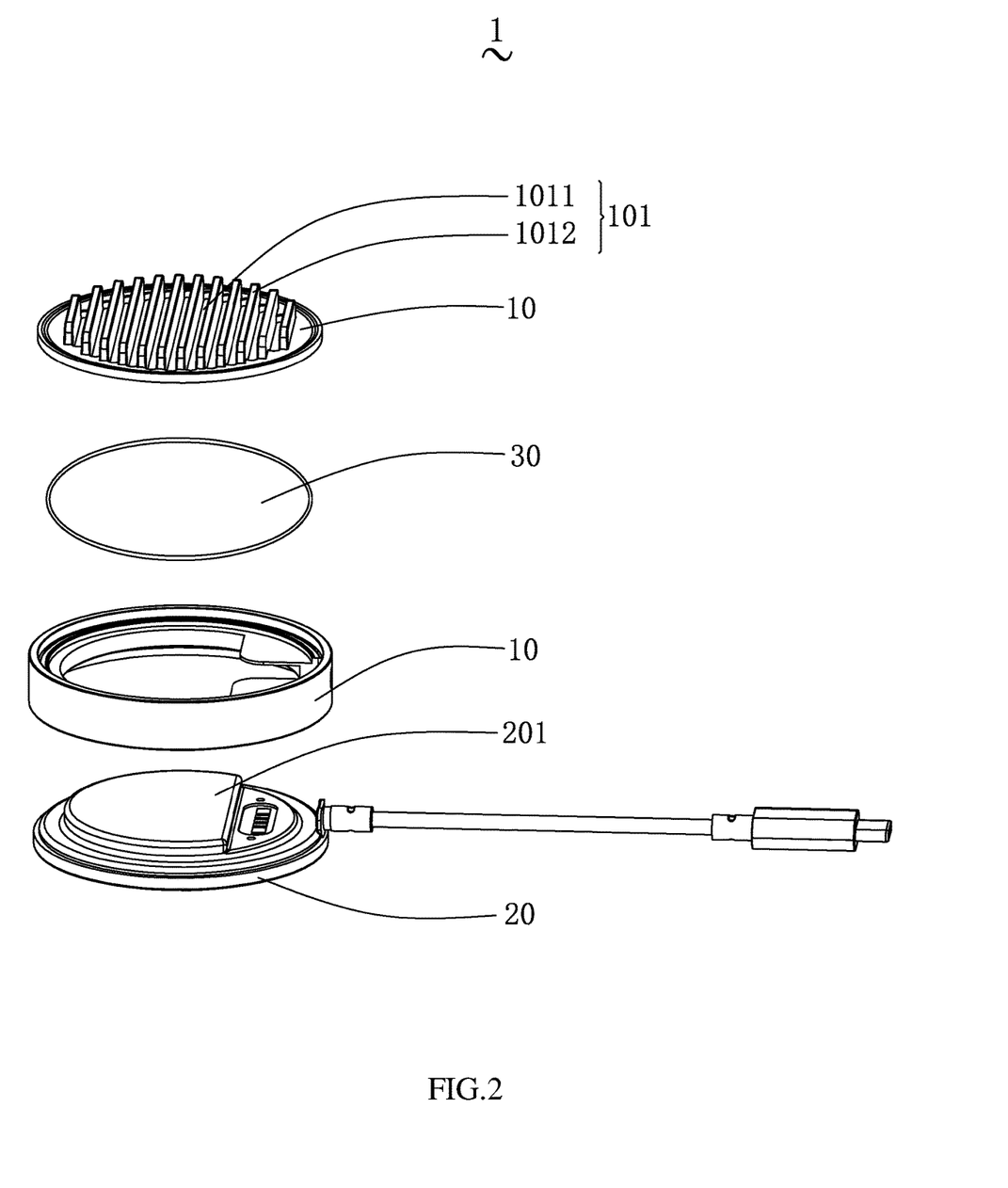
FIG. 2 is an exploded view of the charging device according to the first embodiment of the present disclosure.

Referring to FIG. 1 and FIG. 2, a first embodiment of the present disclosure provides a charging device 1, which includes a housing 10 and a charging module 20 accommodated in the housing 10. The charging module 20 defines a heating surface 201. A first ventilation structure 101 communicated with the interior of the housing 10 is disposed on one side of the housing 10 close to the heating surface 201. A heat-dissipating gel structure 30 is disposed between the heating surface 201 and one side of the housing 10 on which the first ventilation structure 101 is disposed, and the heat-dissipating gel structure 30 is communicated with the ambiance through the first ventilation structure 101.

It can be understood that one side of the heat-dissipating gel structure 30 is in contact with the heating surface 201 of the charging module 20, and the other side thereof is in contact with the first ventilation structure 101 of the housing 10. That is, when the charging module 20 charges an electronic device, outside air and moisture can enter into the heat-dissipating gel structure 30 through the first ventilation structure 101, and then heat is dissipated through the phase transition of the heat-dissipating gel structure 30 to greatly reduce the temperature of the heating surface 201 to ensure that the internal temperature of the charging module 20 is appropriate when charging, and the temperature of the electronic device in contact with the outer side of the charging module 20 can be reduced. Thus, the charging device 1 has functions of excellent adaptive heat dissipation, excellent heat dissipation and safety protection.

Specifically, unlike traditional heat dissipation solutions that rely on passive heat dissipation such as material heat conduction and air convection or active heat dissipation such as built-in energy-consuming fans, the heat-dissipating gel structure 30 positioned on the heating surface 201 is like a kind of artificial intelligence skin. When the temperature of the heating surface 201 is normal, the heat-dissipating gel structure 30 will spontaneously absorb and store moisture in the ambiance; when the temperature of the heating surface 201 is too high, the heat-dissipating gel structure 30 starts "sweating", that is, the stored moisture is evaporated through the phase transition to greatly reduce the temperature of the heating surface 201; when the temperature of the heating surface 201 decreases, the heat-dissipating gel structure 30 stores moisture in the ambiance again, and circulates in this way to complete the heat dissipation and temperature reduction of the heating surface 201.

Further, the heat-dissipating gel structure 30 is a phase-transition heat-dissipating structure including hydrogel. Hydrogel is a quasi-solid material with the water content thereof more than 90%, which can simulate the sweating and heat-dissipating process of organisms to reduce temperature. The phase-transition heat-dissipating structure of the hydrogel, that is, the heat-dissipating gel structure 30, is a kind of extremely hydrophilic three-dimensional grid-structure polymer, and the structure of the cross-linked grid can make it swell a large amount of water. The water in the phase-transition structure can be volatilized in the form of water vapor with heat after being heated. The heat-dissipating gel structure 30 has an excellent heat-dissipating effect, and each 1 g of water evaporated can take away about 2400 J of heat.

Further, the phase-transition temperature of the heat-dissipating gel structure 30 is less than or equal to 45° C. It can be understood that the general temperature of electronic equipment in normal use and charging does not exceed 45° C. If the internal temperature of the charging device 1 is too high, circuits and components therein will be damaged. By arranging the heat-dissipating gel structure 30 with a phase-transition temperature of 45° C. or less, resource utilization can be improved while effective and precise temperature reduction is achieved. Further, the phase-transition temperature of the heat-dissipating gel structure 30 is in the range of 21° C. to 44° C. Specifically, the phase-transition temperature of the heat-dissipating gel structure 30 may be, but not limited to, 21° C., 25° C., 28° C., 30° C., 33° C., 35° C., 38° C., 40° C., 42° C. or 44° C.

Referring to FIG. 2 again, the first ventilation structure 101 defines at least one ventilation channel 1011 hollowed out in the thickness direction of the housing 10, which allows the outside air to enter the heat-dissipating gel structure 30 in the housing 10 through the ventilation channel 1011 to ensure that the heat-dissipating gel structure 30 can absorb moisture in the air for adaptive heat dissipation.

Optionally, the ventilation channel 1011 may be hollowed out along the thickness direction of one side of the housing 10 or the thickness direction of one side surface of the housing 10, as long as the heat-dissipating gel structure 30 can be communicated with the ambiance through the ventilation channel 1011. Specifically, in the embodiment of the present disclosure, the ventilation channel 1011 is hollowed out on the housing 10 along the thickness direction thereof corresponding to the heat-dissipating gel structure 30.

Referring to FIG. 2 again, the first ventilation structure 101 includes a support body 1012 on the housing 10 extending from one side on which the ventilation channel 1011 is positioned to the direction away from the housing 10. It can be understood that when charging an electronic device, the charging device 1 is generally placed on a bearing surface such as a tabletop facing downward with respect to the electronic device, and the support body 1012, due to the height thereof, can support the housing 10 and the electronic device at a certain distance from the tabletop to prevent the ventilation channel 1011 from being covered by the tabletop and facilitate air smoothly entering into the heat-dissipating gel structure 30 through the ventilation channel 1011.

Further, the support body 1012 is disposed at an angle to the plane of the housing 10 on which the first ventilation structure 101 is disposed. It can be understood that the angle arrangement does not limit the support form of the support body 1012, and there can be a variety of aesthetic designs, as long as the support body 1012 is at a certain height away from the bearing surface when supporting the housing 10 in normal use to ensure outside air can smoothly pass through the gaps between the support body 1012 and enter the heat-dissipating gel structure 30.

Further, the support body 1012 is made of metal material and arranged in an array with gaps defined therebetween. It can be understood that part of the heat of the charging module 20 in the housing 10 will be conducted to the housing 10, and the support body 1012 formed on the housing 10 and made of metal material that has good thermal conductivity can better conduct heat to the ambiance. In addition, the arrangement of the array with gaps is aesthetic and beneficial to the stability of the support and the air circulation speed. Thus, the heat-dissipating effect of the charging module 20 is enhanced.

Optionally, the material of the support body 1012 can be, but is not limited to, a material with good thermal conductivity such as metal or graphene. The number of the support body 1012 can be one or more, and when the number of the support body 1012 is more than one, the arrangement thereof can be but is not limited to an array or the like. Specifically, in the embodiment of the present disclosure, the support body 1012 is a plurality of fence structures made of metal material and arranged in arrays.

Figure 3:
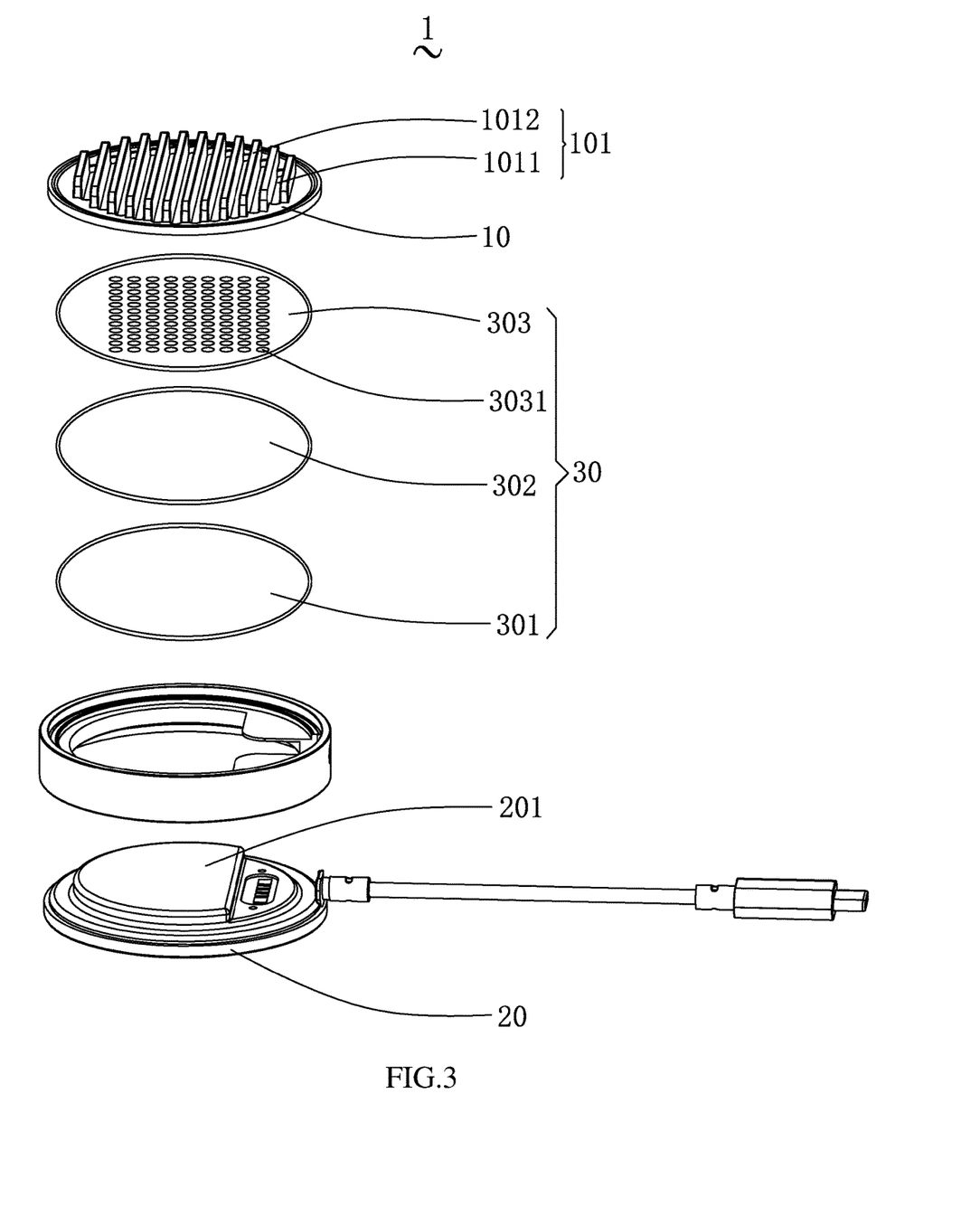
FIG. 3 is another exploded view of the charging device according to the first embodiment of the present disclosure.

Referring to FIG. 3, the heat-dissipating gel structure 30 is made of a flexible material and includes a flexible heat-conducting layer 301 in contact with the heating surface 201 of the charging module 20, a flexible heat-dissipating layer 302 including a heat-dissipating hydrogel, and a flexible protective layer 303, which are stacked in sequence from the direction close to the charging module 20 to the direction away from the charging module 20. It can be understood that the heat of the charging module 20 can be conducted to the flexible heat-dissipating layer 302 and the flexible protective layer 303 through the flexible heat-conducting layer 301 for heat dissipation, or external moisture can also be conducted from the ambiance to the charging module 20 through the flexible heat-dissipating layer 302, which realizes multiple and maximum protections for heat conduction, heat dissipation and protection of the charging module 20.

Further, the flexible heat-conducting layer 301 is a heat-conducting layer in contact with the charging module 20, the flexible heat-dissipating layer 302 is a heat-dissipating layer including heat-dissipating hydrogel, and the flexible protective layer 303, which is close to the inner surface of the housing 10 that forms the first ventilation structure 101, is a gas-permeable dustproof protective layer or a gas-permeable waterproof protective layer.

It can be understood that the flexible heat-conducting layer 301 is in contact with the heating surface 201 of the charging module 20, which can first realize effective heat conduction and flexible collision protection for the charging module 20; second, the flexible heat-conducting layer 301 can be used as a carrier to which the flexible heat-dissipating layer 302 is adhered; third, the hydrogel heat-dissipating layer is a temperature-sensitive and flexible hydrogel film that sweats like organisms to dissipate heat at high temperature and absorbs and stores water at low temperature, and circulates in this way to dissipate most of the heat as simple and efficient as skin via the principle of phase transition to dissipate heat; fourth, the gas-permeable dustproof or gas-permeable waterproof flexible protective layer 303 is close to the first ventilation structure 101 to provide a transmission path of moisture for the flexible heat-dissipating layer 302 and to prevent external dust from adhering to and damaging the flexible heat-dissipating layer 302.

Further, the flexible heat-conducting layer 301 can be, but is not limited to, a heat-conducting silicone layer, a heat-conducting PET layer, a heat-conducting PU layer, a heat-conducting foam layer, a heat-conducting leather film, a heat-conducting rubber layer, a copper foil, a ceramic film, a glass film, or a graphene composite film, etc.

It can be known that the flexible heat-dissipating layer 302 includes heat-dissipating hydrogel, namely hydrogel. Specifically, the heat-dissipating hydrogel includes at least one of acrylamide hydrogel, polyacrylamide hydrogel, 4-Ethyl Acryloylacetate hydrogel, sodium polyacrylate hydrogel, polyvinyl alcohol hydrogel, sodium alginate hydrogel and sodium carboxymethyl cellulose hydrogel.

It can be known that the flexible protective layer 303 is a material of gas-permeable dustproof or gas-permeable waterproof, which may be, but is not limited to, polytetrafluoroethylene gas-permeable film, non-woven fabric, or the like. Specifically, in the embodiment of the present disclosure, the flexible protective layer 303 is a non-woven material.

Further, the areas of the flexible heat-conducting layer 301 and the flexible protective layer 303 are both greater than or equal to the area of the flexible heat-dissipating layer 302. It can be understood that the flexible heat-dissipating layer 302 including hydrogel is soft and resilient, has fluidity and high viscosity, and the flexible heat-conducting layer 301 provides an attachable carrier for the flexible heat-dissipating layer 302 to facilitate the uniform distribution and extension of the flexible heat-dissipating layer 302. In addition, the flexible heat-conducting layer 301 and the flexible protective layer 303 can cover the flexible heat-dissipating layer 302 to realize the protection function.

Referring to FIG. 3, the flexible protective layer 303 is close to the inner surface of the housing 10 that forms the first ventilation structure 101, and a second ventilation structure 3031 communicated with the first ventilation structure 101 is formed on the flexible protective layer 303, that is, outside air can pass through the first ventilation structure 101 and the second ventilation structure 3031 to enter the heat-dissipating gel structure 30. It can be understood that due to the material properties, the second ventilation structure 3031 is a material with tiny grids, that is, the aperture thereof is small, while the first ventilation structure 101, which pays more attention to the ventilation effect, is hollowed out with the ventilation channel 1011 with a larger hollowed-out area. When the charging temperature is too high, the ambient gas pressure increases relatively, and gas turbulence occurs when the gas flows through the tiny grids; when the temperature is low, the ambient gas pressure decreases relatively, and the gas flow has the characteristics of molecular flow. It can also be known that the ventilation areas of the first ventilation structure 101 and the second ventilation structure 3031 are different, resulting in different air circulation pressures, which can increase the air circulation speed during convection to improve the heat-dissipating efficiency.

Further, the thickness of the heat-dissipating gel structure 30 is in the range of 1.0-1.2 mm. Optionally, the thickness of the heat-dissipating gel structure 30 may be 1.0 mm, 1.1 mm, or 1.2 mm. The thickness range of the heat-dissipating gel structure 30 is reasonably controlled so that the entire heat-dissipating gel structure 30 can be made light and thin, and more conducive to heat dissipation while giving the user a comfortable experience.

Further, the thickness of the flexible heat-conducting layer 301 is in the range of 0.1-0.5 mm; the thickness of the flexible heat-dissipating layer 302 is in the range of 0.5-0.7 mm; the thickness of the flexible protective layer 303 is in the range of 0.1-0.3 mm. By controlling the thickness range of the three flexible layers respectively, and using the most effective heat-dissipating thickness of each layer with flexible material, the thin and light and effective heat dissipation of the three flexible layers can be realized.

Optionally, the thickness of the flexible heat-conducting layer 301 can be 0.1 mm, 0.2 mm, 0.3 mm, 0.4 mm, or 0.5 mm; the thickness of the flexible heat-dissipating layer 302 can be 0.5 mm, 0.6 mm, or 0.7 mm; the thickness of the flexible protective layer 303 can be 0.1 mm, 0.2 mm, or 0.3 mm.

Further, the reducing temperature of the heat-dissipating gel structure 30 and the first ventilation structure 101 to the heating surface 201 of the charging module 20 is in the range of 1-6° C., which realizes effective heat dissipation and protection of the charging device 1.

Specifically, a TC-08 thermocouple data recorder, a T-type thermocouple and an infrared temperature-measuring thermal imager are used to test the temperature reduction range of the heat-dissipating gel structure 30, and the average temperature of each heating point of the heating surface 201 with the heat-dissipating gel structure 30 is reduced by a maximum of 6° C. within one hour. The reasonable thickness of the heat-dissipating gel structure 30 is also one of the factors conducive to temperature reduction, and the temperature reduction range can be effectively adjusted according to the test data of the thermocouple.

Figure 4:
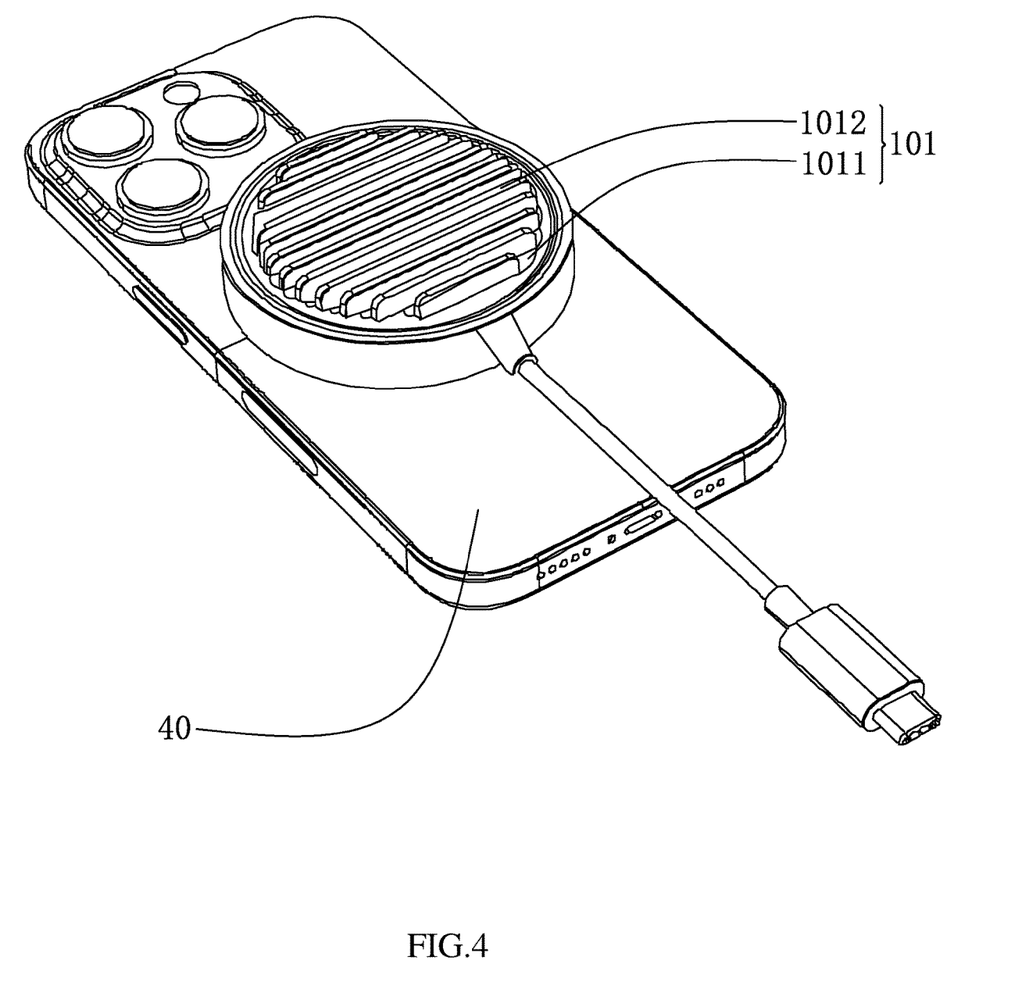
FIG. 4 is a schematic diagram of a charging and use state of the charging device according to the first embodiment of the present disclosure.

Referring to FIG. 4 again, the embodiment of the present disclosure provides a general visual state of the charging device 1 during normal use. During charging, the side of the charging device 1 away from the first ventilation structure 101 is used to contact the device 40 to be charged, so that the charging device 1 can provide heat dissipation protection for the charging device 1 and the device 40 to be charged while providing electric energy.

Optionally, the charging device 1 may be provided with a hollowed-out housing to cover the support body 1012 to achieve functions of heat dissipation and aesthetic, as long as the air intake of the ventilation channel 1011 is not affected.

Figure 5:
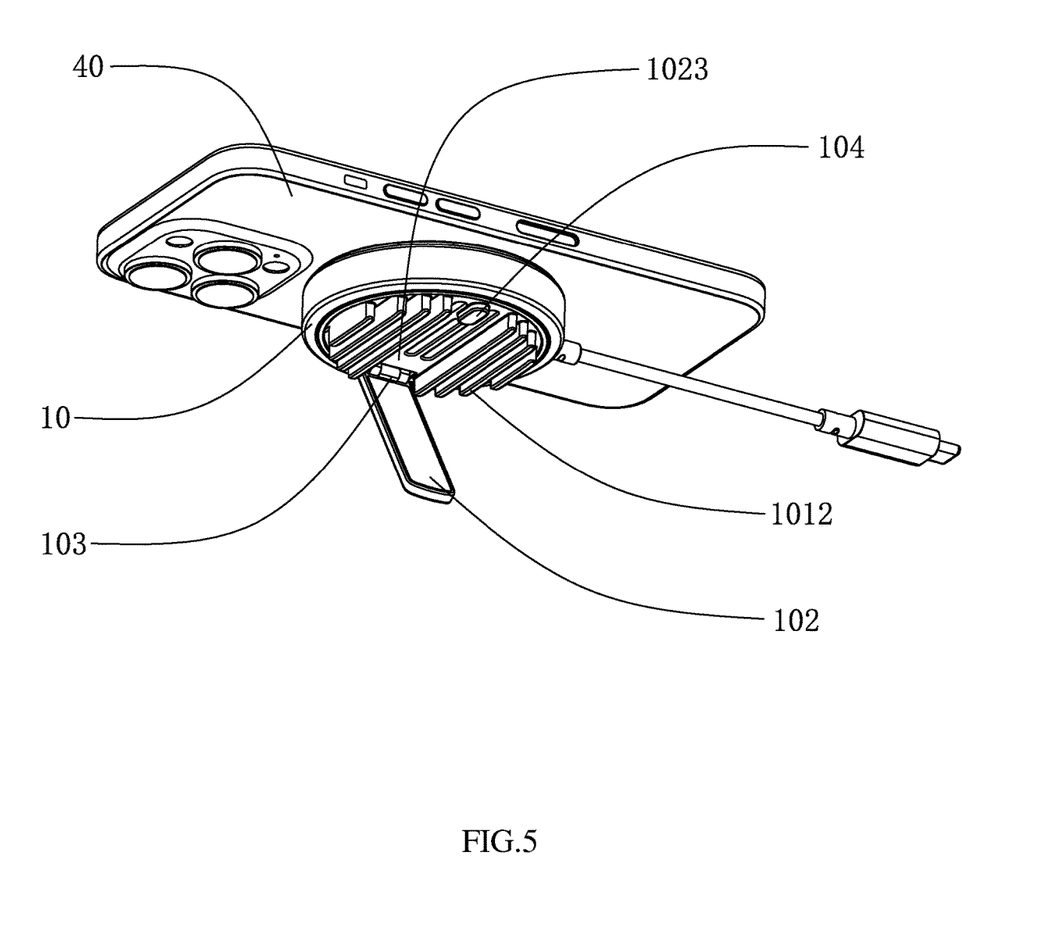
FIG. 5 is an exploded view of the charging device according to a second embodiment of the present disclosure.
Figure 6:
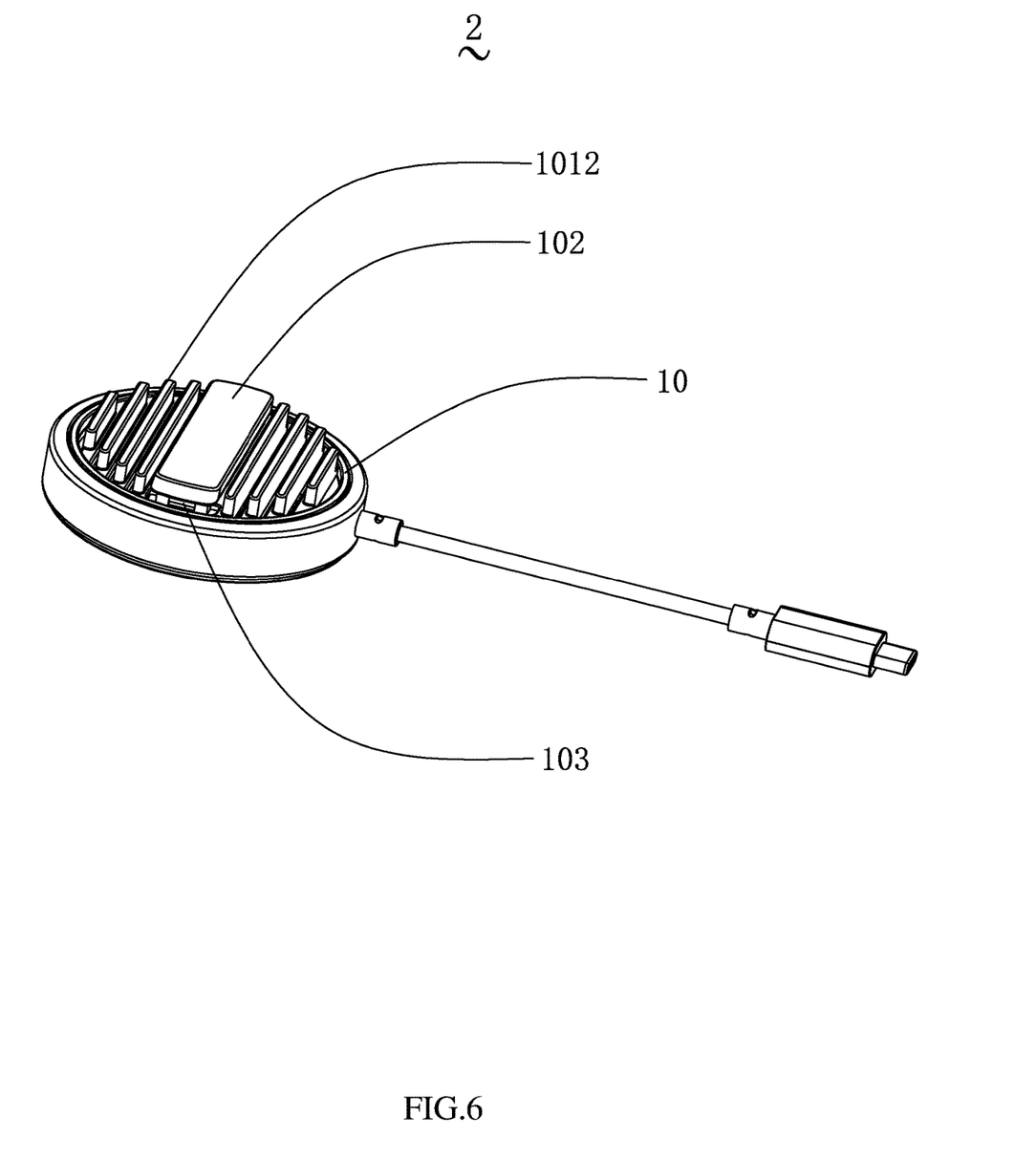
FIG. 6 is a schematic diagram of a support frame of the charging device in a storage configuration according to the second embodiment of the present disclosure.

Referring to FIGS. 5-6, a second embodiment provides a charging device 2, which is different from the charging device provided by the first embodiment in that: the charging device 2 further includes a support frame 102 on the housing 10 at the side thereof away from the heat-dissipating gel structure, and one end of the housing 10 corresponding to the support frame 102 is provided with a rotating structure 103 damply connected with the rotating structure 103. It is understood that the rotating structure 103 and the support frame 102 damply connected with the rotating structure 103 are provided on the housing 10, such that after the electronic device 40 is attached to the charging device 2, the connection between the support frame 102 and the housing 10 is achieved via the connection between the support frame 102 and the rotating structure 103. Thus, the support frame 102 can be rotatably connected to the housing 10 and the relative position therebetween after rotation can be maintained via the damping force. Additionally, after rotation, the charging device 2 and the electronic device 40 can be supported at different angles when in use to improve practicality thereof.

Specifically, the middle of the support body 1012 on the housing 10 is formed with an accommodating slot 1023 that matches the volume of the support frame 102. When the support frame 102 does not need to work, the support frame 102 can be stored in the accommodating slot 1023 and form a flat surface with the support body 1012; when the support frame 102 needs to be supported for work, expand and rotate the support frame 102 from the accommodating slot 1023 to a desired angle.

Specifically, referring to FIG. 7 again, the rotating structure 103 is disposed at one end of the accommodating slot 1023, that is, the rotating structure 103 is disposed on the side of the housing 10 away from the heat-dissipating gel structure and corresponding to the support frame 102. The rotating structure 103 includes a fixing seat 1031 embedded in the housing 10 and a rotating shaft 1032 connected to one end of the fixing seat 1031. Further, one end of the fixing seat 1031 is embedded in the housing 10 to achieve connection with the housing 10, and the other end thereof is provided with a shaft hole 10311. One end of the support frame 102 close to the fixing seat 1031 protrudes to form a shaft seat 1021 with a shaft hole 10311. The rotating shaft 1032 simultaneously passes through the shaft hole 10311 on the support frame 102 and the shaft hole 10311 on the fixing seat 1031, that is, the damping connection between the support frame 102 and the fixing seat 1031 is achieved through the damping cooperation between the rotating shaft 1032 and the shaft hole 10311.

Figure 7:
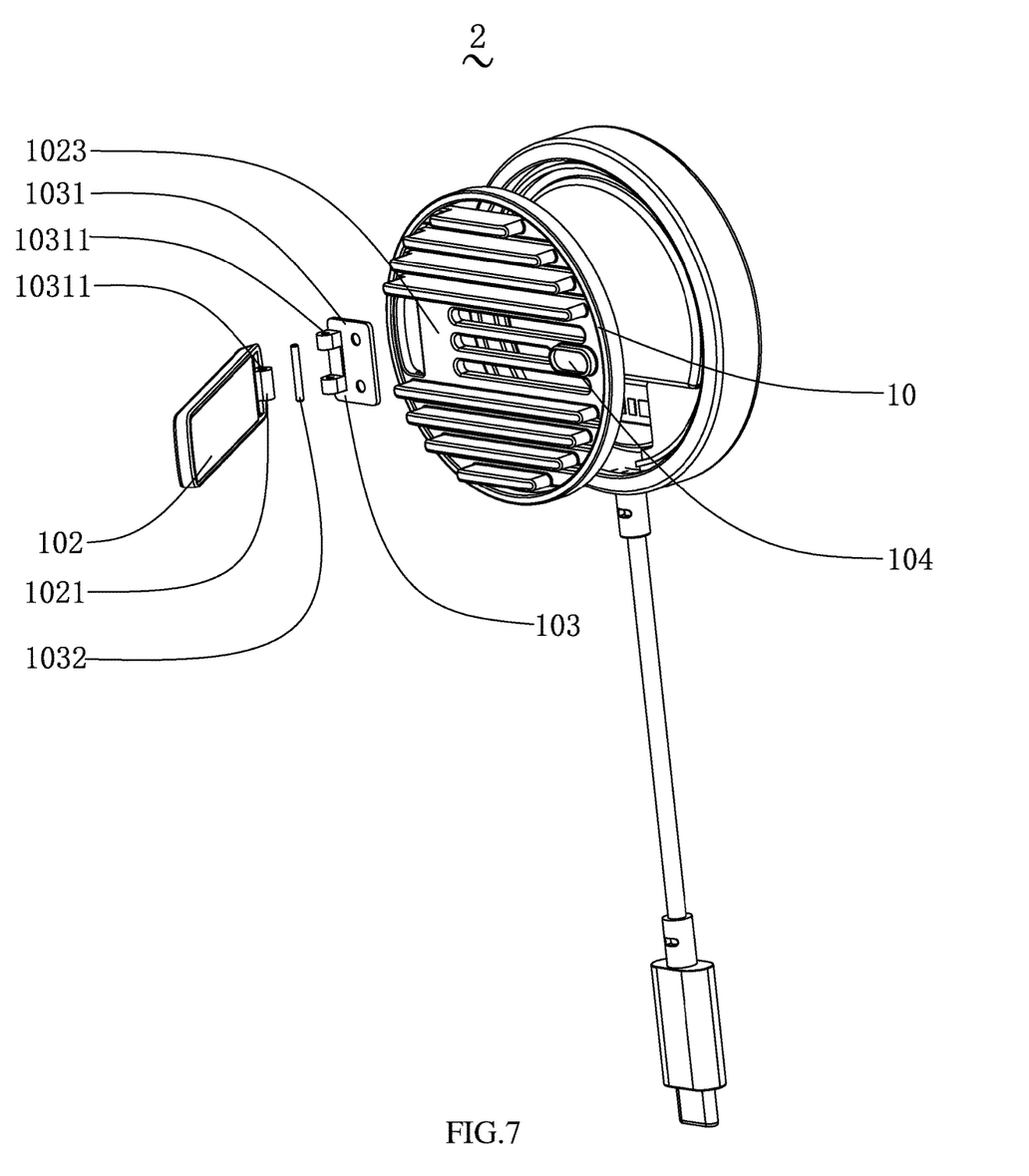
FIG. 7 is an exploded view of the charging device according to the second embodiment of the present disclosure.

Further, the housing 10 of the charging device 2 is also provided with a magnetic attraction member 104, which is disposed on the same side of the housing 10 as the rotating structure 103 and is disposed at the other end of the accommodating slot 1023 with respect to the rotating structure 103. One end of the support frame 102 away from the rotating structure 103 is provided with a magnetic member. When the support frame 102 is stored in the accommodating slot 1023, the position of the end of the support frame 102 with the magnetic member corresponds to the magnetic attraction member 104 and is connected thereto, which can prevent the support frame 102 from falling off from the housing 10 during storage, enhance the stability of the device and improve the practicality of the device. Specifically, in this embodiment, the magnetic member is a magnet or a material that can be magnetically attracted to the magnetic attraction member 104, such as a magnetizable metal or a magnet with opposite polarity to the magnetic attraction member 104.

It can be understood that the area of the support frame 102 is less than the area of the contact surface between the housing 10 and the electronic device, that is, it must be ensured that the first ventilation structure should not be completely shielded to ensure that the heat-dissipating gel structure can be connected with the ambiance through the first ventilation structure, that is, the heat dissipation effect of the heat-dissipating gel structure should not be affected.

It can be understood that the charging device can be any one of a wireless charger for electronic devices, a power bank, and a charger for electronic devices, which has the function of excellently heat dissipation and can meet the different needs of users.

Figure 8:
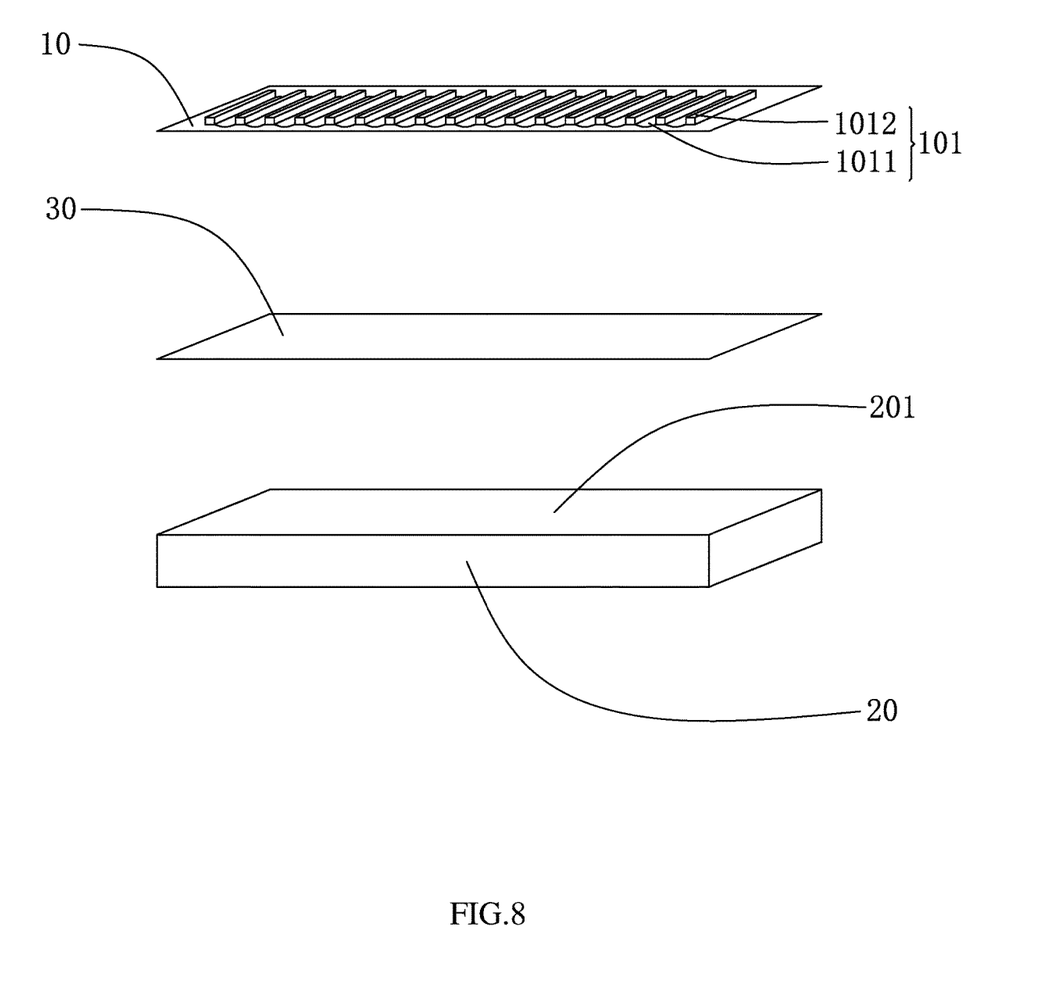
FIG. 8 is another exploded view of the charging device according to the second embodiment of the present disclosure.

Referring to FIG. 8 again, further, it can be known that the components arrangement of the above-mentioned devices are conventional, and the above-mentioned devices all provide a charging module 20 including components such as circuit boards, a heating surface 201 caused by the charging module 20 during use, and a housing 10. In the first embodiment, a first ventilation structure 101 is disposed on the housing 10, and a heat-dissipating gel structure 30 is disposed between the first ventilation structure 101 and the heating surface 201. A large amount of heat of the above-mentioned devices is dissipated through the combination of the first ventilation structure 101 and the heat-dissipating gel structure 30 to guarantee the safety during use. In the second embodiment, which is based on the first embodiment, a rotating structure and a support frame damply connected thereto are disposed on the side of the housing away from the heat-dissipating gel structure, which has the heat dissipation function of the first embodiment and can also support electronic devices and charging devices, can meet the needs of users to use mobile phones while charging, and is more practical.

Compared with the prior art, the charging device of the present disclosure has the following beneficial effects.

The charging device of the present disclosure includes a housing and a charging module accommodated in the housing. The charging module defines a heating surface, and a first ventilation structure communicated with the interior of the housing is disposed on a side of the housing close to the heating surface. A heat-dissipating gel structure is disposed between the heating surface and the side of the housing on which the first ventilation structure is disposed, and the heat-dissipating gel structure is communicated with the ambiance through the first ventilation structure. The heat-dissipating gel structure is in contact with the heating surface and communicated with the ambiance through the first ventilation structure, so that the charging device can have functions of excellent adaptive heat-dissipating, excellent heat dissipation and safety protection.

The first ventilation structure of the present disclosure defines at least one ventilation channel hollowed out in the thickness direction of the housing, which allows the outside air to enter the heat-dissipating gel structure in the housing through the ventilation channel, and ensures that the heat-dissipating gel structure can obtain moisture in the air for adaptive heat dissipation.

The first ventilation structure of the present disclosure includes a support body on the housing extending from the side on which the ventilation channel is positioned to the direction away from the housing. It can be understood that when charging an electronic device, the charging device is generally placed on a bearing surface such as a tabletop facing downward with respect to the electronic device, and the support body, due to the height thereof, can support the housing and the electronic device at a certain distance from the tabletop, which can prevent the ventilation channel from being covered by the tabletop to facilitate the smooth entry of air into the heat-dissipating gel structure through the ventilation channel.

The support body of the present disclosure is made of metal material, and is arranged in an array with gaps defined therebetween. It can be understood that part of the heat of the charging module in the housing will be conducted to the housing, and the support body formed on the housing and made of metal material that has good thermal conductivity can better conduct heat to the ambiance. In addition, the arrangement of the array with gaps is aesthetic and beneficial to the stability of the support and the air circulation speed. Thus, the heat-dissipating effect of the charging module is enhanced.

The support body of the present disclosure is arranged at an angle to the plane of the housing on which the first ventilation structure is disposed. It can be understood that the angle arrangement does not limit the support form of the support body, and there can be a variety of aesthetic designs, as long as the support body is at a certain height away from the bearing surface when supporting the housing in normal use to ensure the outside air can smoothly pass through the gaps between the support body and enter the heat-dissipating gel structure.

The heat-dissipating gel structure of the present disclosure is made of a flexible material, and includes a flexible heat-conducting layer in contact with the heating surface of the charging module, a flexible heat-dissipating layer including a heat-dissipating hydrogel, and a flexible protective layer, which are stacked in sequence from the direction close to the charging module to the direction away from the charging module. It can be understood that the heat of the charging module can be conducted to the flexible heat-dissipating layer and the flexible protective layer through the flexible heat-conducting layer for heat dissipation, or external moisture can also be conducted from the ambiance to the charging module through the flexible heat-dissipating layer, which realizes multiple and maximum protections for heat conduction, heat dissipation and protection of the charging module. Further, the flexible heat-conducting layer is in contact with the heating surface of the charging module, which can first realize effective heat conduction and flexible collision protection for the charging module, second, the flexible heat-conducting layer can be used as a carrier to which the flexible heat-dissipating layer is adhered; third, the hydrogel heat-dissipating layer is a temperature-sensitive and flexible hydrogel film that sweats like organisms to dissipate heat at high temperature and absorbs and stores water at low temperature, and circulates in this way to dissipate most of the heat as simple and efficient as skin via the principle of phase transition to dissipate heat; fourth, the gas-permeable dustproof or gas-permeable waterproof flexible protective layer is close to the first ventilation structure to provide a transmission path of moisture for the flexible heat-dissipating layer and to prevent external dust from adhering to and damaging the flexible heat-dissipating layer.

The flexible protective layer of the present disclosure is close to the inner surface of the housing that forms the first ventilation structure, and a second ventilation structure communicated with the first ventilation structure is formed on the flexible protective layer. It can be understood that the second ventilation structure with a small aperture is provided to make the flexible protective layer gas-permeable, dustproof and waterproof, while the first ventilation structure, which pays more attention to the ventilation effect, is hollowed out with a ventilation channel. Thus, the air communication therebetween ensures that air and air moisture can be convected through the first ventilation structure to the second ventilation structure, and then transmitted to the flexible heat-dissipating layer to realize the heat dissipation protection of the charging module.

The thickness of the heat-dissipating gel structure of the present disclosure is in the range of 1.0-1.2 mm. It can be understood that the thickness range of the heat-dissipating gel structure is reasonably controlled, so that the entire heat-dissipating gel structure is light and thin, which is more conducive to heat dissipation while giving users a comfortable experience.

In the present disclosure, the reducing temperature of the heat-dissipating gel structure and the first ventilation structure to the heating surface of the charging module is in the range of 1-6° C., which realizes effective heat dissipation and protection of the charging device.

The charging device further includes a support frame on the housing at the side thereof away from the heat-dissipating gel structure, and one end of the housing corresponding to the support frame is provided with a rotating structure damply connected with the rotating structure. It is understood that the rotating structure and the support frame damply connected with the rotating structure are provided on the housing, such that after the electronic device is attached to the charging device, the connection between the support frame and the housing is achieved via the connection between the support frame and the rotating structure. Thus, the support frame can be rotatably connected to the housing and the relative position therebetween after rotation can be maintained via the damping force. Additionally, after rotation, the charging device and the electronic device can be supported at different angles when in use to improve practicality thereof.

The charging device of the present disclosure is any one of a wireless charger for electronic devices, a power bank, and a charger for electronic devices, which can meet the different needs of users.

The foregoing descriptions are only preferred embodiments of the present disclosure, and should not be construed as limiting the scope of the disclosure. Any modifications, equivalent replacements and improvements made within the principles of the present disclosure should be included within the protection scope of the present disclosure.

The invention claimed is:

1. A charging device, comprising a housing and a charging module accommodated in the housing;
wherein the charging module defines a heating surface, a first ventilation structure communicated with the interior of the housing being disposed on one side of the housing close to the heating surface of the charging module; a heat-dissipating gel structure being disposed between the heating surface of the charging module and the side of the housing on which the first ventilation structure is disposed, and the heat-dissipating gel structure being communicated with ambiance through the first ventilation structure.

2. The charging device according to claim 1, wherein the first ventilation structure defines at least one ventilation channel hollowed out in the thickness direction of the housing.

3. The charging device according to claim 2, wherein the first ventilation structure comprises a support body on the housing extending from the side on which the ventilation channel is positioned to the direction away from the housing.

4. The charging device according to claim 3, wherein the support body is made of metal material.

5. The charging device according to claim 4, wherein the support body is arranged in an array with gaps defined therebetween.

6. The charging device according to claim 4, wherein the support body is arranged at an angle to the plane of the housing on which the first ventilation structure is disposed.

7. The charging device according to claim 1, wherein the heat-dissipating gel structure is made from a flexible material and comprises a flexible heat-conducting layer in contact with the heating surface of the charging module, a flexible heat-dissipating layer comprising a heat-dissipating hydrogel, and a flexible protective layer, which are stacked in sequence from the direction close to the charging module to the direction away from the charging module.

8. The charging device according to claim 7, wherein the flexible protecting layer is a protective layer with gas-permeable dustproof or a gas-permeable waterproof features.

9. The charging device according to claim 7, wherein the thickness of the flexible heat-conducting layer is in the range of 0.1-0.5 mm.

10. The charging device according to claim 7, wherein the thickness of the flexible heat-dissipating layer is in the range of 0.5-0.7 mm.

11. The charging device according to claim 7, wherein the thickness of the flexible protective layer is in the range of 0.1-0.3 mm.

12. The charging device according to claim 7, wherein the area of the flexible heat-conducting layer and the flexible protective layer are larger than or equal to the area of the flexible heat-dissipating layer.

13. The charging device according to claim 7, wherein the flexible protective layer is close to the inner surface of the housing on which the first ventilation structure is disposed.

14. The charging device according to claim 7, wherein a second ventilation structure communicated with the first ventilation structure is formed on the flexible protective layer.

15. The charging device according to claim 1, wherein the thickness of the heat-dissipating gel structure is in the range of 1.0-1.2 mm.

16. The charging device according to claim 1, wherein the reducing temperature of the heat-dissipating gel structure and the first ventilation structure to the heating surface of the charging module is in the range of 1-6° C.

17. The charging device according to claim 3, further comprising a support frame disposed on the housing and disposed at one side of the housing away from the heat-dissipating gel structure, wherein one end of the housing corresponding to the support frame is provided with a rotating structure, and the support frame is damply connected with the rotating structure.

18. The charging device according to claim 13, further comprising a accommodating slot on the support body of the housing corresponded to the volume of the support fame.

19. The charging device according to claim 1, wherein the charging device is any one of a wireless charger for electronic devices, a power bank, and a charger for electronic devices.

* * * * *